US012754556B2

(12) United States Patent
Mühlnickel et al.

(10) Patent No.: US 12,754,556 B2
(45) Date of Patent: Oct. 6, 2026

(54) METHOD AND SYSTEM FOR LEARNING A DRIVING ROUTE OF AN AUTONOMOUSLY DRIVING AGRICULTURAL DRIVING ROBOT

(71) Applicant: GEA FARM TECHNOLOGIES GMBH, Bönen (DE)

(72) Inventors: Jan Mühlnickel, Unna (DE); Rainer Graser, Laupheim (DE); Timo Bressmer, Ulm (DE); Peter Fischer, Ulm (DE); Manuel Wopfner, Langenau (DE)

(73) Assignee: GEA Farm Technologies GmbH, Bönen (DE)

( * ) Notice: Subject to any disclaimer, the term of this patent is extended or adjusted under 35 U.S.C. 154(b) by 31 days.

(21) Appl. No.: 18/877,298

(22) PCT Filed: Jun. 16, 2023

(86) PCT No.: PCT/EP2023/066202
§ 371 (c)(1),
(2) Date: Dec. 20, 2024

(87) PCT Pub. No.: WO2023/247340
PCT Pub. Date: Dec. 28, 2023

(65) Prior Publication Data

US 2025/0377661 A1 Dec. 11, 2025

(30) Foreign Application Priority Data

Jun. 23, 2022 (DE) ..................... 10 2022 115 706.7

(51) Int. Cl.
*G05D 1/229* (2024.01)
*G05D 1/221* (2024.01)
(Continued)

(52) U.S. Cl.
CPC ........... *G05D 1/2297* (2024.01); *G05D 1/221* (2024.01); *G05D 1/246* (2024.01); *G05D 1/617* (2024.01);
(Continued)

(58) Field of Classification Search
CPC ...... G05D 1/2297; G05D 1/617; G05D 1/221; G05D 1/246; G05D 2107/21; G05D 2109/10; G05D 2111/32; G05D 2105/50
See application file for complete search history.

(56) References Cited

U.S. PATENT DOCUMENTS

2018/0361577 A1 12/2018 Williams et al.
2018/0373256 A1 12/2018 Runde et al.
(Continued)

FOREIGN PATENT DOCUMENTS

CN 104663483 A 6/2015
EP 2878193 A1 6/2015
(Continued)

OTHER PUBLICATIONS

International Search Report and Written Opinion mailed Sep. 21, 2023 in related/corresponding International Application No. PCT/EP2023/066202.
(Continued)

*Primary Examiner* — Gertrude Arthur Jeanglaude
(74) *Attorney, Agent, or Firm* — PATENT PORTFOLIO BUILDERS PLLC

(57) ABSTRACT

A method for learning a route of an autonomously driving agricultural robot involves providing an environmental map, driving along a route in the region of the environmental map from a starting point to an end point by manually controlling the driving robot, locating the driving robot while driving along the route with the aid of a sensor arranged on the driving robot, and recording coordinates of waypoints along
(Continued)

Figure 1A:
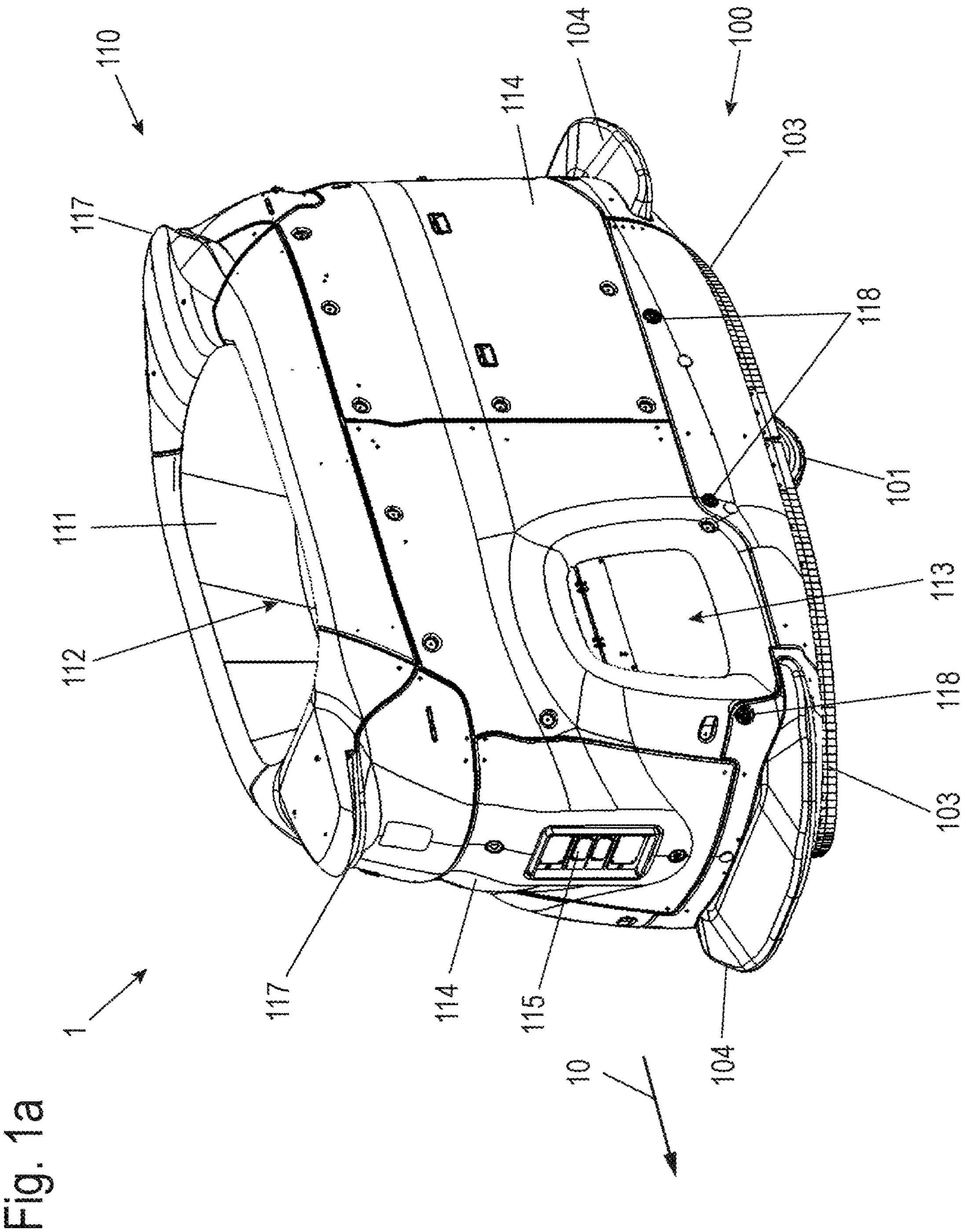

the route based on the locating process that has been carried out. The route is validated by autonomously driving along the route taking the stored coordinates of the waypoints into account, wherein the route is manually confirmed and then the confirmed route is marked as being able to be driven along autonomously.

19 Claims, 8 Drawing Sheets

(51) Int. Cl.

| | |
|---|---|
| ***G05D 1/246*** | (2024.01) |
| ***G05D 1/617*** | (2024.01) |
| *G05D 105/50* | (2024.01) |
| *G05D 107/20* | (2024.01) |
| *G05D 109/10* | (2024.01) |
| *G05D 111/30* | (2024.01) |

(52) U.S. Cl.
CPC ..... *G05D 2105/50* (2024.01); *G05D 2107/21* (2024.01); *G05D 2109/10* (2024.01); *G05D 2111/32* (2024.01)

(56) References Cited

U.S. PATENT DOCUMENTS

| | | | | |
|---|---|---|---|---|
| 2019/0246600 | A1 | 8/2019 | Buijs et al. | |
| 2020/0029489 | A1 | 1/2020 | Bertucci et al. | |
| 2020/0029490 | A1 * | 1/2020 | Bertucci .............. | G05D 1/0274 |
| 2021/0026348 | A1 * | 1/2021 | Gogna ................. | G05D 1/0038 |
| 2021/0064050 | A1 | 3/2021 | Pickett et al. | |

FOREIGN PATENT DOCUMENTS

| | | | |
|---|---|---|---|
| WO | 2008097080 | A1 | 8/2008 |
| WO | 2018074917 | A2 | 4/2018 |

OTHER PUBLICATIONS

Search Report created Jun. 29, 2023 in related/corresponding DE Application No. 10 2022 115 706.7.

* cited by examiner

METHOD AND SYSTEM FOR LEARNING A DRIVING ROUTE OF AN AUTONOMOUSLY DRIVING AGRICULTURAL DRIVING ROBOT

BACKGROUND AND SUMMARY OF THE INVENTION

Exemplary embodiments of the invention relate to a method for learning a driving route of an autonomously driving agricultural driving robot, in particular in a barn or yard area, as well as to a system with an autonomously driving agricultural driving robot, with which a driving route can be learnt.

Many tasks in a barn or yard area of a farm are linked to the transportation of materials. For example, feeding systems are often used to feed animals, in which feed rations are mixed from various basic ingredients in a central area, the so-called "kitchen", according to need and in a timely manner, and distributed along so-called "feed alleys" to feed the animals. Another example concerns the removal of animal excrement. The cleaning of yard or barn areas is also usually carried out using vehicles due to the size of the areas.

In order to carry out these tasks as autonomously as possible and with as little manpower as possible, automated systems and equipment for these different applications have become established in the agricultural sector.

For example, an autonomously operating feeding system for animals, such as cows, is known from publication WO 2008/097080 A1. A central component of this system is an autonomously driving vehicle having a feed container that can be filled automatically in a central so-called "kitchen area". The feed can be mixed during the journey from the feed containers to the unloading point of the feed. At the unloading point, feed is automatically dispensed by tipping the container. Various options are described with regard to the movement of the vehicle, for example that the path is predetermined via previously laid rails. Another alternative described is autonomous navigation using sensors or route markings. Navigation based on a radio positioning system, such as the GPS (Global Positioning System), is also described.

In particular, if a route is not defined by laid tracks or other routing, a learning procedure is necessary to enable navigation in the barn or yard area at all.

The publication WO 2018/074 917 A2 discloses such a learning method for an autonomously driving agricultural driving robot, in which, in a first step, the autonomously driving robot is manually controlled along a desired route using an external mobile device, for example a tablet computer. During manual control, sensor data recorded by the driving robot is sent to the mobile device, where it is displayed on a map together with the position of the driving robot. Transmitted sensor data includes, for example, measured current distances to objects. The route traveled is saved and can then be automatically traveled by the driving robot in an autonomous navigation process.

Displaying additional information on the mobile device used as a remote control may be helpful, but it also distracts the user from closely observing the driving robot during the learning drive.

Exemplary embodiments of the present invention are directed to a learning method for an agricultural driving robot, in which a route can be learnt intuitively and with full concentration on the driving robot and the route can still be checked and, optionally, corrected, for example with regard to safety distances or the like.

A method according to the invention of the type mentioned at the beginning has the following steps: An environmental map is provided and a driving route, which lies in the region of the environmental map, is manually traveled by the driving robot from a starting point to an end point under manual control by a user. During the travel of the driving route, the driving robot is localized using at least one sensor arranged on the driving robot and coordinates of waypoints along the driving route are recorded based on the localization that has taken place. In the next step, the driving route is autonomously traveled by the driving robot, taking into account the stored coordinates of the waypoints, wherein the driving route is manually confirmed by the user. After this step of validating the driving route, the driving route is marked as confirmed and is therefore available for subsequent autonomous driving.

In this method, the learning of the driving route, which is also referred to as the route for short in the following, is carried out by means of controlled manual movement independently of validation of the route, which takes place during a new movement. When the desired route is traveled in a manually controlled manner, full concentration can therefore be placed on the route itself and the driving robot during the travel. If the route is then traveled automatically for the first time for validation, the user can concentrate on the surroundings of the driving robot directly or also on displayed measured values and check the distances to be maintained, etc. Only when the route has been confirmed by the user is it marked as autonomously drivable and is then available for independent, autonomous navigation. By splitting the learning process into one step of manually specifying the route and then validating it, the user's attention is not overtaxed and the learning process itself can be carried out without the risk of a collision or other error.

In an advantageous design of the method, the driving robot is manually steered back to the starting point before the validation step and the route is autonomously traveled in the same direction in the validation step as it was specified in the step of manual travel. Routes are usually learned in the direction in which they will later be traveled. Because the route is validated in the same direction as it was learned in the manual travel step, validation also takes place in the direction of subsequent use and is therefore practical. Alternatively, it is also conceivable to validate the route in a direction of travel that is opposite to the direction in which the route was specified in the step of manual travel. Optionally, it may also be provided to validate both directions of travel, especially if a route is also used in both directions during autonomous productive operation.

In a further advantageous design of the method, the route is confirmed section by section during validation. Active or passive confirmation may be required.

In the case of active confirmation, the route or a route section is considered confirmed if the user actively performs an action during the validation step. An active action can, for example, be an actuation of a control element on the driving robot itself or on a remote control, which was preferably also used previously to control the driving robot to manually travel the route. Such a remote control is, for example, wirelessly coupled with a control device of the driving robot.

In the case of passive confirmation, the route or a route section is considered confirmed if the user does not intervene to correct or stop the movement of the driving robot during the validation step.

In a further advantageous design of the method, a distance to a surrounding object is measured via at least one distance sensor during the manually controlled and/or automatic travel of the route. The distance sensor can be the sensor used for navigation or localization and/or a sensor independent of it. Preferably, the measured distance to the surrounding object is compared with a predefined or predeterminable safety distance, wherein an acoustic and/or visual warning is emitted if the distance falls below the safety distance. It is also preferable that no additional information, such as measured distances to obstacles, is displayed on the user's remote control to distract the user while the route is being learned, i.e., while the route is being predefined by manual driving. Nevertheless, both during learning and during validation, it is possible to signal if the safety distances to detected obstacles are not reached by means of an acoustic and/or visual warning signal, preferably on the driving robot itself. This prevents possible collisions without distracting the user's attention from the position and movement of the driving robot. Furthermore, it may be provided that a validation of a route element is prevented if a breach of the safety distance is detected.

In a further advantageous design of the method, at least one marked point can be defined by the user during manual travel of the route while the driving robot is stationary. One or more functions to be performed can be assigned to such a marked point, which the driving robot then performs at or from the marked point during subsequent operation. A marked point can also represent the starting or end point of at least one route.

In a further advantageous design of the method, it is possible for the route to be changed manually by the user or automatically in whole or in sections before the validation step by changing the coordinates of the waypoints. Manual intervention can be used to subsequently influence the routing without the need for a new complete manual run. It may be provided in this case that marked points cannot be moved. However, it is also conceivable that the option of manual correction is also available for marked points, possibly with increased security conditions, e.g., only after (additional) user authorization and/or authentication, or by allowing only a minor change to the recorded coordinates.

The main aim of automated modification is to smooth the route or a section of the route. Recorded route elements that include several neighboring waypoints are transformed into smoothed route elements using mathematical functions.

For example, filter algorithms, in particular low-pass filters, can be used to shift the recorded waypoints in order to reduce "swerves" during the journey. Curve smoothing can also be achieved by completely recalculating the position of waypoints of route elements using suitable parametrically modeled curves. In this case, the recorded position of a waypoint is not taken into account in its recalculation and the route element is only determined by the position of its end points (usually marked points). Mixed forms are also conceivable in which the recorded position of a waypoint is taken into account in its recalculation with an adjustable weighting. In both manual and automatic correction of the position of waypoints, restrictive boundary conditions can be specified for changing the coordinates of the waypoints. Such boundary conditions can relate to maximum displacements, to transitions to the next waypoints, e.g., to prevent a bending connection to the following or preceding waypoints, and/or to minimum distances to objects that must be maintained.

A system according to the invention comprising an autonomously driving agricultural driving robot and a remote control for manually controlling the driving robot is set up to carry out said method. This results in the advantages mentioned in connection with the method.

BRIEF DESCRIPTION OF THE DRAWING FIGURES

Figure 2:
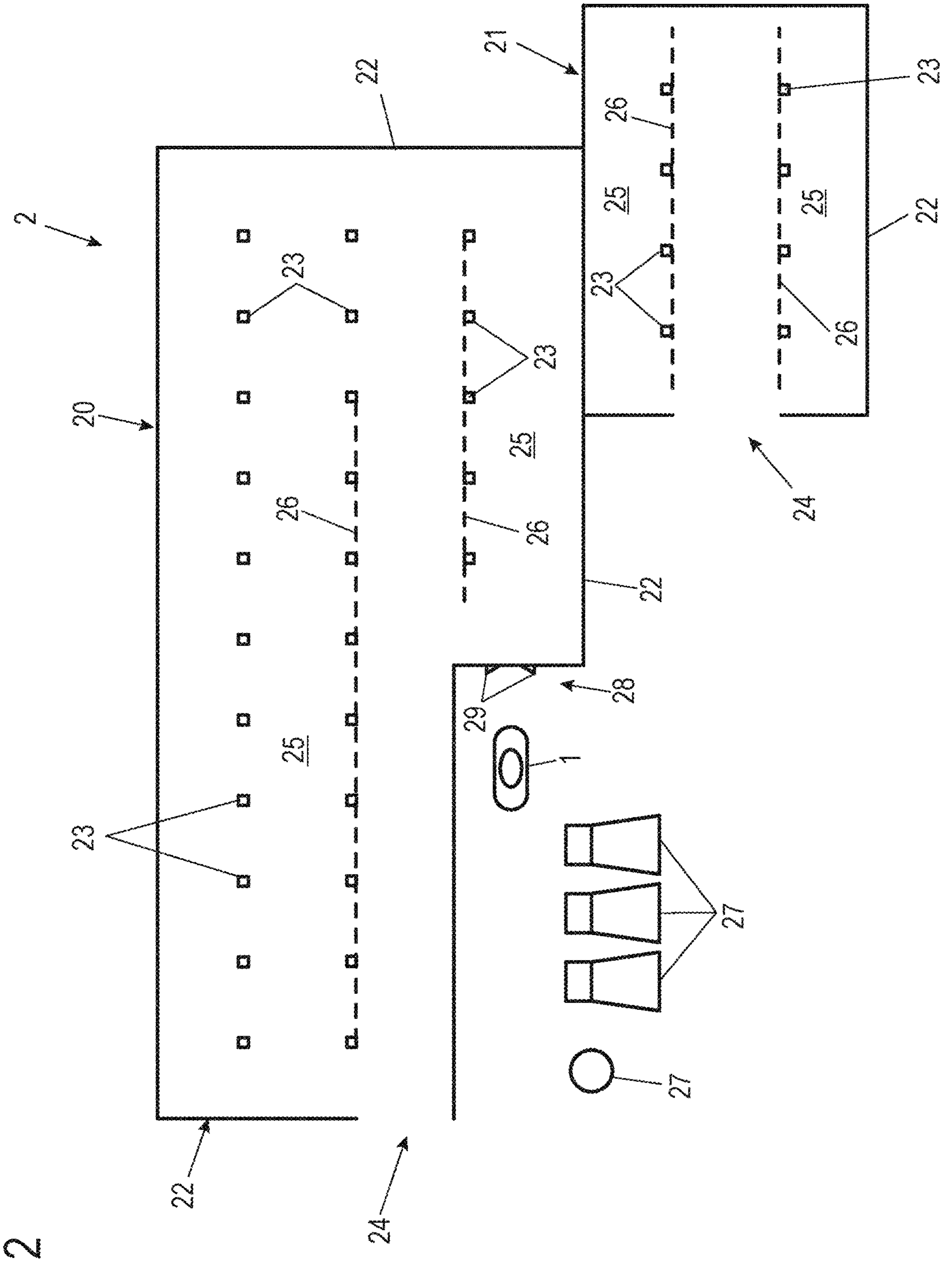
Figure 4:
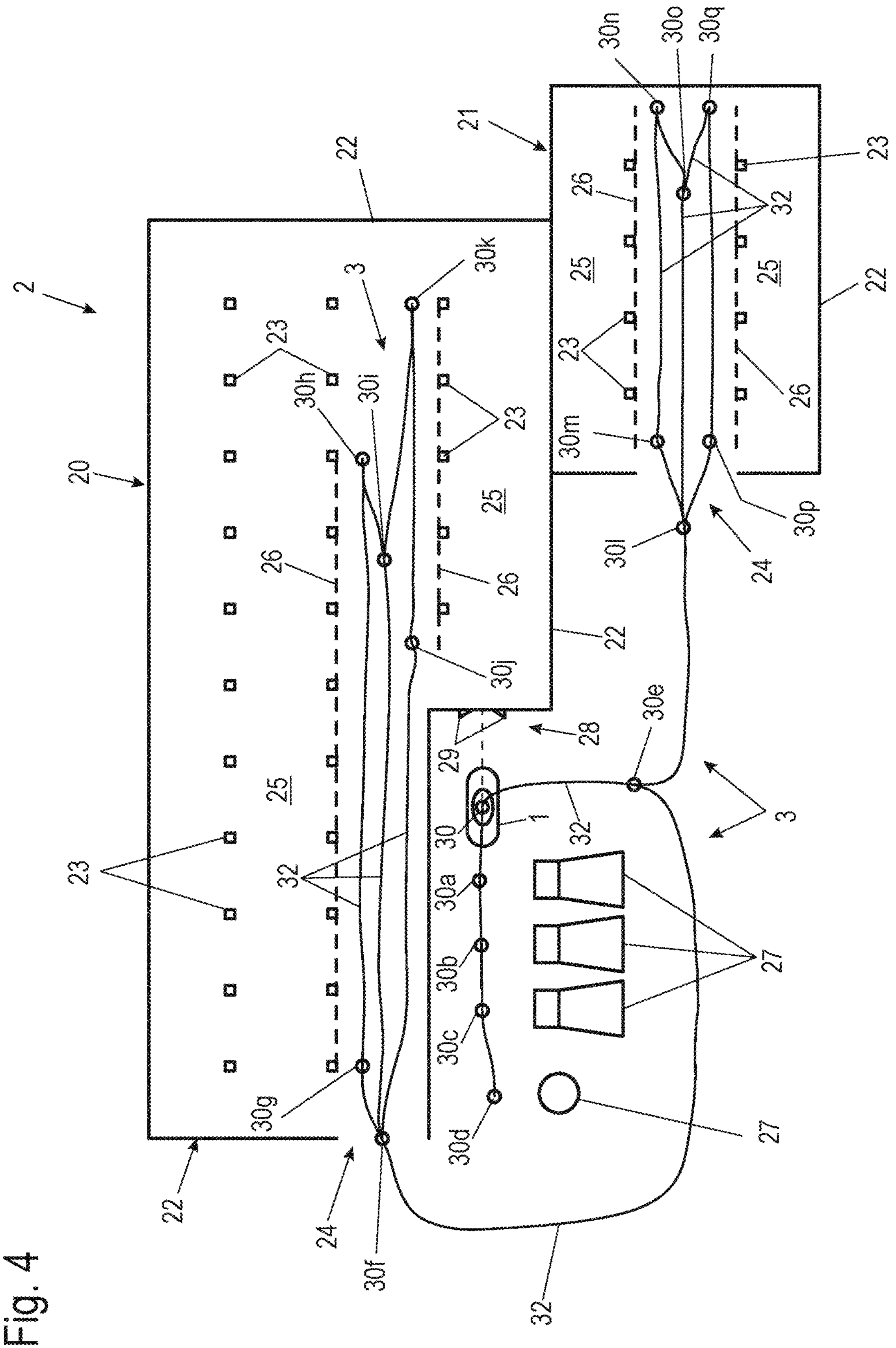
Figure 5:
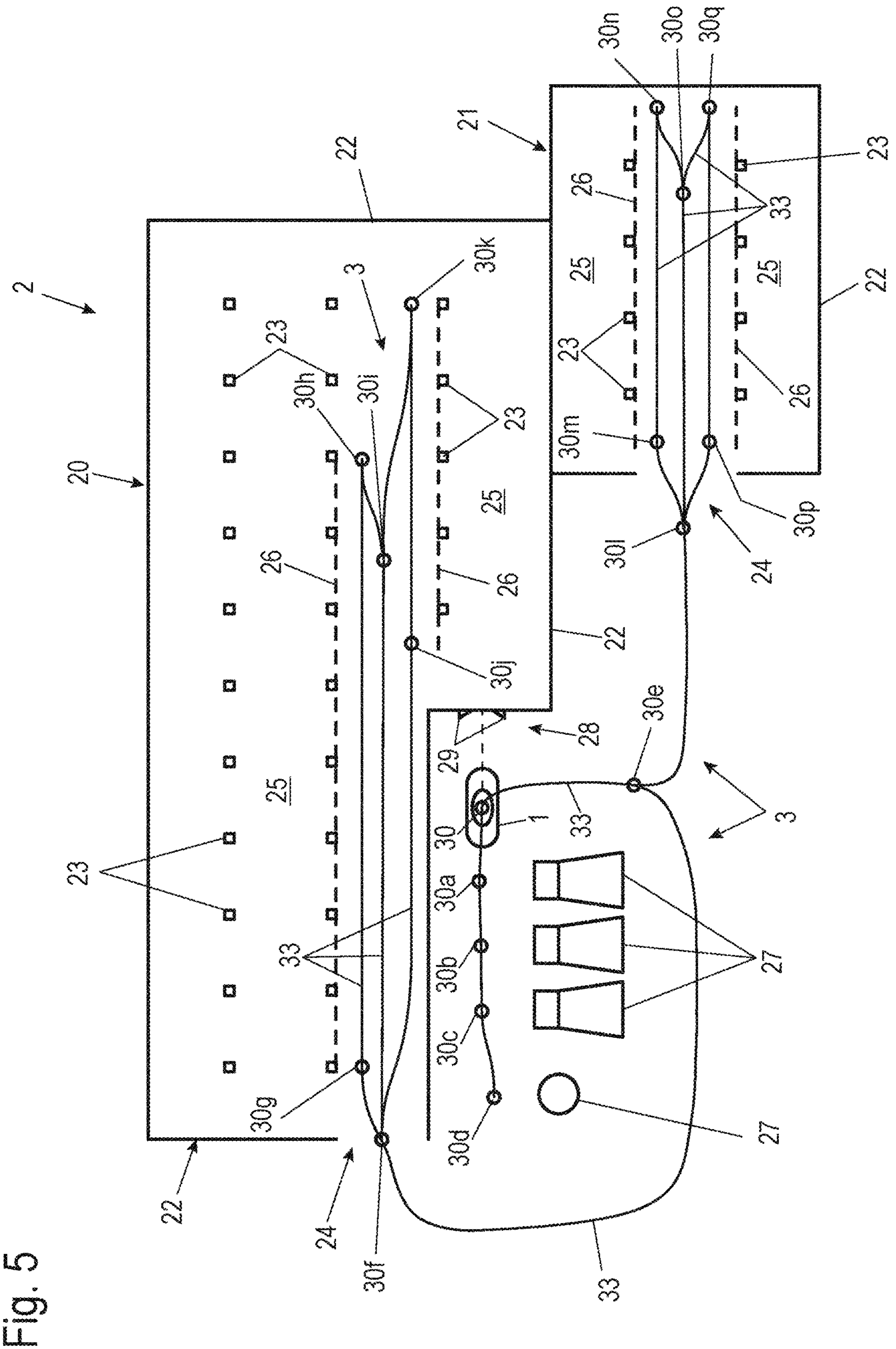

The invention is explained in more detail below by means of an exemplary embodiment with the aid of figures, wherein the figures show as follows:

FIGS. 1*a, b* each show an oblique view of an example of a driving robot from different angles;

FIG. 2 shows a map of a barn and yard area with a driving robot;

FIGS. 3*a-f* show a section of the map of FIG. 2 in various phases of a learning method according to the invention;

FIG. 4 shows the map of FIG. 2 with a plurality of manually specified routes; and FIG. 5 shows the map according to FIG. 4 with smoothed sections.

DETAILED DESCRIPTION

Figure 1B:
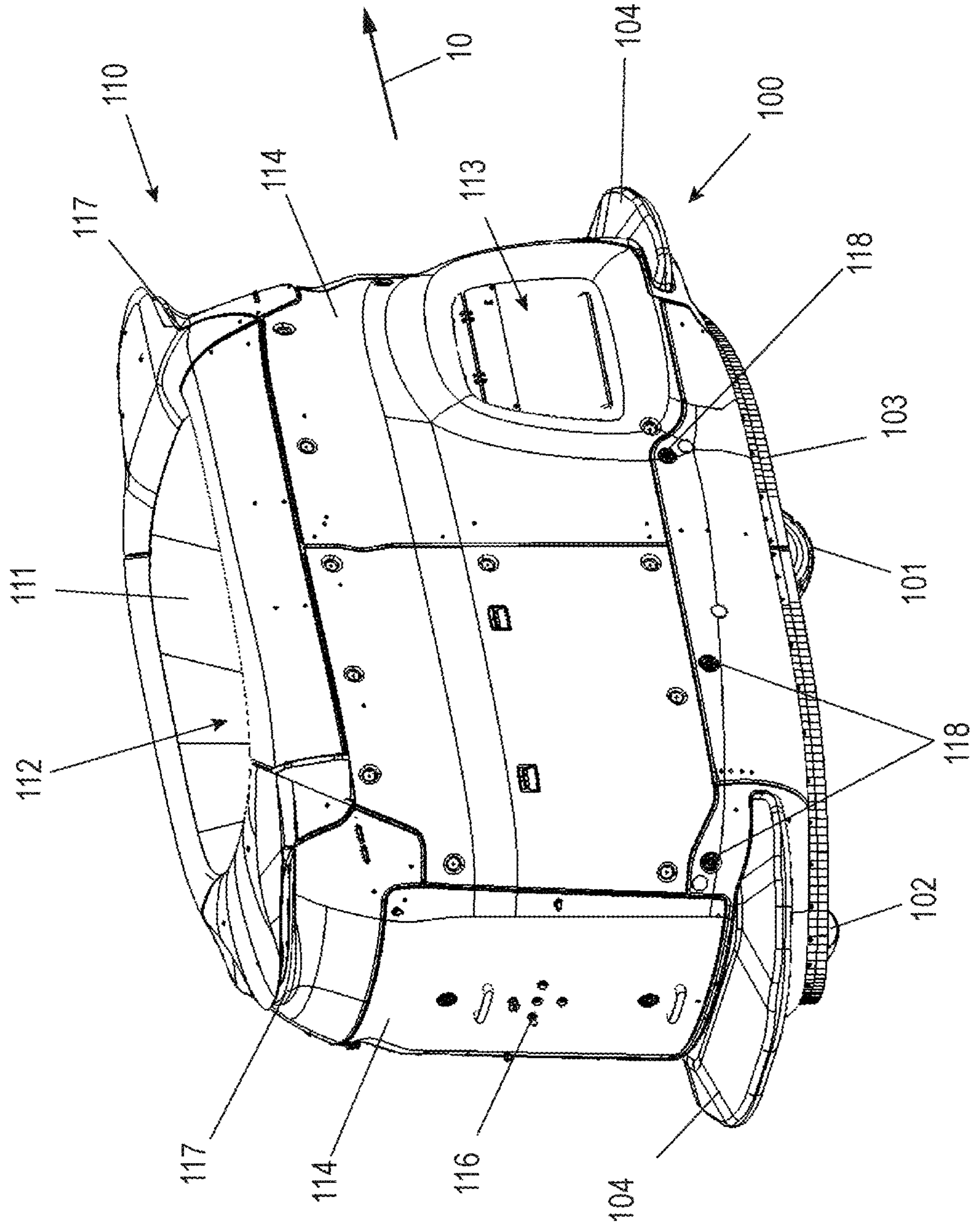

FIGS. 1*a* and 1*b* show an example of a driving robot 1 for agricultural tasks in a general view from different angles. The learning method for routes described below can, for example, be carried out with this driving robot 1.

In this example, the driving robot 1 is a so-called "feeding robot", which is set up to pick up food from a dispensing point, mix it automatically, and unload it at one or more feeding points. The driving robot 1 is therefore also referred to below as a "feeding robot" or simply "robot".

Identical reference signs indicate elements that are identical or have the same effect in all figures. For reasons of clarity, not every element in every figure is provided with a reference sign. In the description, the terms "right" and "left" refer to the respective representation of the figure. The terms "top" and "bottom", on the other hand, refer to the natural orientation of the driving robot. The terms "front" and "rear" refer to a forward direction of travel 10 of the driving robot 1. The forward direction of travel 10, which is indicated by a directional arrow in FIGS. 1*a, b*, represents the main direction of travel of the driving robot 1.

The driving robot 1 has two main components, a chassis 100 and a body 110.

The chassis 100 is preferably universally applicable and can be used together with various functional units if necessary. In FIGS. 1*a, b*, only cladding and/or protective elements, specifically a surrounding apron 103 and two bumpers 104, can be seen on the chassis 100, as well as two of a total of four wheels, specifically one of two drive wheels 101 (in FIGS. 1*a, b*) and one of two swivel wheels 102 (in FIG. 1*b*). Another of the swivel wheels is located at the front in the forward direction of travel 10 and is concealed under the apron 103 in FIGS. 1*a, b*. In the present exemplary embodiment of a feeding robot, the apron 103 also functions as a feed pusher, with which feed that has already been unloaded can be pushed together.

The body 110 essentially determines the functionality of the driving robot and thus its intended use within the barn or yard area.

In the case of the driving robot 1 equipped as a feeding robot in the present case, the body 110 has a feed container 111 as a key component. The feed to be distributed is taken into the feed container 111 and can be mixed during filling, in a charging station 28 (see FIG. 2) and/or during the journey using a mixing device 112, which is not visible in FIGS. 1*a* and 1*b*. To discharge the feed, a feed conveyor 113 is provided, which is implemented with the aid of a conveyor belt. Depending on the direction of travel of the conveyor belt, feed can be dispensed to either side of the feeding robot. The arrangement of the feed container 111 and the feed conveyor 113 represent the functional unit of the driving robot 1, as they provide the specific functionality of the same and thus define it as a feeding robot.

The body 110 further comprises a cladding formed using a plurality of cladding elements, typically cladding panels 114. The cladding panels 114 can preferably be removed separately in order to gain access to underlying components and their maintenance or replacement. Elements accessible from the outside are integrated into the cladding, for example charging contacts 115 (see FIG. 1*a*) and operating and/or display elements 116 (see FIG. 1*b*). The driving robot 1 is set up to automatically enter the charging station 28 (see FIG. 2), in which the charging contacts 115 are contacted in order to recharge batteries or other power storage devices of the driving robot 1.

The driving robot 1 is also equipped with a navigation system that enables navigation in the barn or yard area without fixed infrastructure elements such as rails or guide cables. For this purpose, the driving robot is equipped with a plurality of sensors that are either integrated into the cladding or protrude from the cladding.

FIGS. 1*a* and 1*b* show two lidar (light detection and ranging) sensors 117, which are used for object detection to support navigation. The two lidar sensors 117 are arranged at the front and rear of the driving robot respectively. Alternatively or additionally, an optical camera can be arranged at the front and optionally also at the rear in the direction of travel. The cameras are then used for object or step detection or to provide additional support for navigation. The cameras can be inclined downwards in order to be able to record and thus monitor the ground area directly in front of the driving robot 1 in both directions of travel (i.e., when driving forwards and backwards). Furthermore, ultrasonic sensors 118 are distributed around the circumference of the driving robot 1 in the lower area of the cladding as distance sensors to nearby obstacles.

Other sensors (not visible here) are mechanical sensors that detect the application of force to one or both bumpers 104. For this purpose, the respective bumper 104 can be movably mounted, for example, so that one of possibly several sensors is actuated when moving against a spring force. In an alternative design, the bumper 104 can be formed in an outer area from an elastically deformable material, in particular a foam material, into which a sensor is incorporated, which detects a deformation preferably along the entire edge of the bumper 104. In this way, a collision with an obstacle is advantageously damped and detected at the same time. In one design, for example, two spaced-apart electrodes can be embedded in the elastic material along the edge of the bumper 104, between which a capacitance is detected. A change in capacitance indicates a deformation of the material. In a further design, a tension chain can be incorporated into the elastic material, which is coupled to a switch or sensor. A deformation of the elastic material leads to a tension on the tension chain, which is detected by the switch or sensor.

The driving robot 1 has at least one control device that controls the actuators of the driving robot, including driving motors, and reads and evaluates signals from the sensors. The control device also performs navigation tasks and maintains a stored map of the environment, which is used, among other things, to localize the driving robot in its environment. The map is preferably created by the driving robot 1 itself in a so-called SLAM (Simultaneous Localization and Mapping) process by evaluating the sensor data recorded during various journeys. In addition, the control device is equipped or coupled with communication interfaces, in particular for wireless communication. The communication interfaces are used, for example, to connect to a higher-level operations management system that coordinates the use of the driving robot 1. The communication interfaces can also be used to control the driving robot 1 using a remote control.

FIG. 2 shows a two-dimensional map of a farm 2 on which a driving robot 1 is to be used as a feeding robot. In principle, several driving robots can also be used on a farm to deliver the feed from the feed bunkers to the animals. The driving robot 1 can be designed as shown in FIGS. 1*a*, 1*b*, for example.

In the example shown here, the farm 2 comprises two barns, specifically a first barn 20 and a second barn 21, for keeping animals, for example for keeping cows, and a surrounding yard area. In the example, the two barns 20, 21 differ in size, with the second barn 21 being an outbuilding to the larger first barn 20, which in this sense is to be regarded as the main barn. The number of two barns 20, 21 on farm 2 is purely exemplary, as are their size and arrangement.

Both barns 20, 21 have walls 22 on the outside and a plurality of supporting pillars 23 on the inside. This is also purely exemplary. The barns 20, 21 could also be provided with walls on the inside. Furthermore, a gate 24 is provided for each of the barns 20, 21.

Several animal areas 25 are provided within each of the two barns 20, 21, i.e., areas in which animals, e.g., the aforementioned cows, are kept. Each animal area 25 is assigned a so-called "feed fence" 26, in front of which feed is placed, which the animals can pick up from the animal area 25.

Outside the barns 20, 21, i.e., in the yard area of the farm 2, several feed bunkers 27 are set up in which different types of feed are kept for the animals. By way of example, three larger feed bunkers 27 are shown, which are used to hold silage feed, for example. A smaller feed bunker 27, shown round in the schematic FIG. 1, is used to hold concentrated feed. The feed bunkers 27 each have feed conveyors with which the received feed or concentrated feed can be dispensed.

The map of farm 2 shown in FIG. 2 is a schematic drawing which, however, essentially reflects what the driving robot 1 detects of its environment with the aid of the lidar sensors 117. The two lidar sensors 117 arranged on the driving robot 1 scan the environment in a two-dimensional plane that is aligned parallel to the chassis 100 and thus essentially parallel to the ground on which the driving robot 1 is moving. Accordingly, the driving robot 1 only detects features via the lidar sensors 117 that are located in the scanning plane of the lidar sensors 117. In the example shown, this is at a height of approximately 1.5-2.5 m (meters) above the ground. For this reason, only the contours of the feed bunkers 27 that are at this height are detected, which is why, for example, hoses or conveyor belts that are used to dispense the picked-up feed or concentrated feed are not visible in this plan. Also not visible are grids or other barriers that are formed around the animal areas 25. The non-visible elements also include the feed fences 26, which are therefore shown as dashed lines in FIG. 2.

In order to be able to use the driving robot 1 on the farm 2, routes, i.e., possible paths of the driving robot 1, are defined in accordance with the invention in a learning method. During operation of the driving robot 1, a navigation method can then compile a route from the acquired routes, depending on the task to be completed, along which the driving robot moves in order to be able to fulfill its tasks.

In the following, a method according to the invention is explained using the farm 2 shown in FIG. 2 as an example. The driving robot 1 is trained, for example, to be able to use routes that run between a charging station 28, the feed bunkers 27, and the various feed depositing points in front of the feed fences 26.

In the farm 2 shown, the charging station 28 is mounted adjacent to the feed bunkers 27. The charging station 28 is controlled by the driving robot 1 in order to charge batteries for its energy supply. The charging station 28 comprises contacts which, when the driving robot 1 is correctly positioned, make contact with the charging contacts 115 (see FIG. 1*a*) and via which charging current is provided to charge the batteries of the driving robot 1. As explained above, the driving robot 1 uses the signals from the lidar sensors 117 to determine its position as part of navigation. Signals from other sensors, e.g., from wheel rotation sensors for odometry, can be used to increase the position accuracy.

In the vicinity of the charging station 28, an alternative positioning method can be used in which markings on the charging station are detected optically. Such markings are, for example, the reflectors 29 shown in FIG. 2, which are detected by the driving robot 1 using the lidar sensors 117 or other optically operating sensors. In the vicinity of the charging station 28, a higher positioning accuracy required for contacting can be achieved than with the help of contour-based navigation.

Figure 3A:
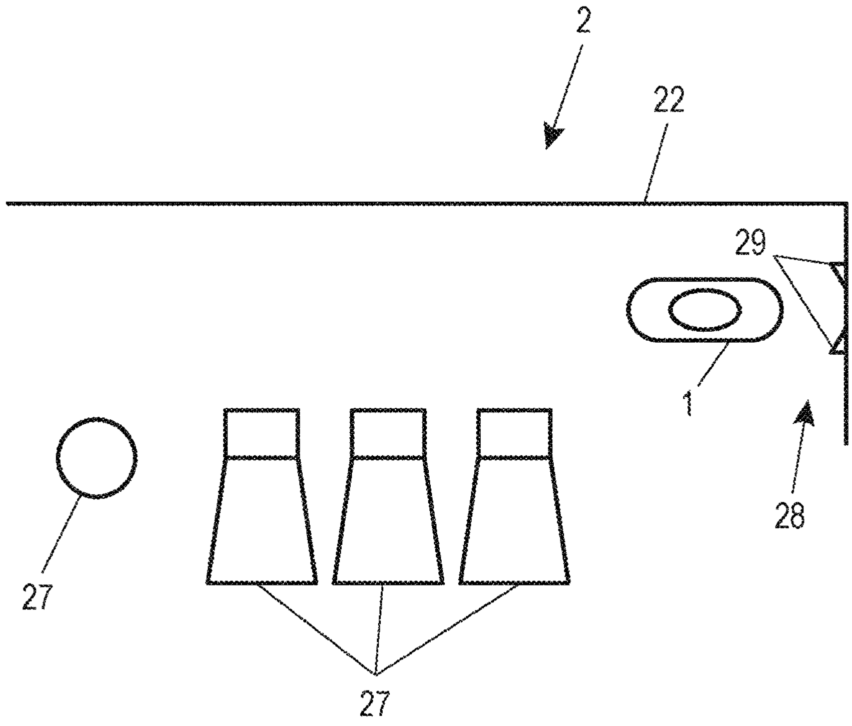

FIG. 3*a* first shows an enlarged section of the farm 2 in the area of the feed bunker 27 and the charging station 28.

In a first step, which is carried out in preparation for the learning method according to the application, the driving robot 1 is manually steered into the vicinity of the charging station 28 so that it is at a distance of about 1-2 m from the charging station 28 and is positioned in its direction of travel 10 aligned with the charging station 28. The distance and position are selected so that it is possible to navigate into the charging station 28 using the reflectors 29.

To control the driving robot 1, a remote control (not shown here) is used, which preferably, but not necessarily, communicates wirelessly with the driving robot 1. An optical or radio-based communication link can be used for transmission. In particular, a universally usable mobile end device of a user, e.g., a tablet computer, can be used as a remote control. The communication link can be established directly between the tablet computer and a receiving device of the driving robot 1 or also via a shared communication network, for example a WLAN (Wireless Local Area Network) network, which is available on the farm 2.

Figure 3B:
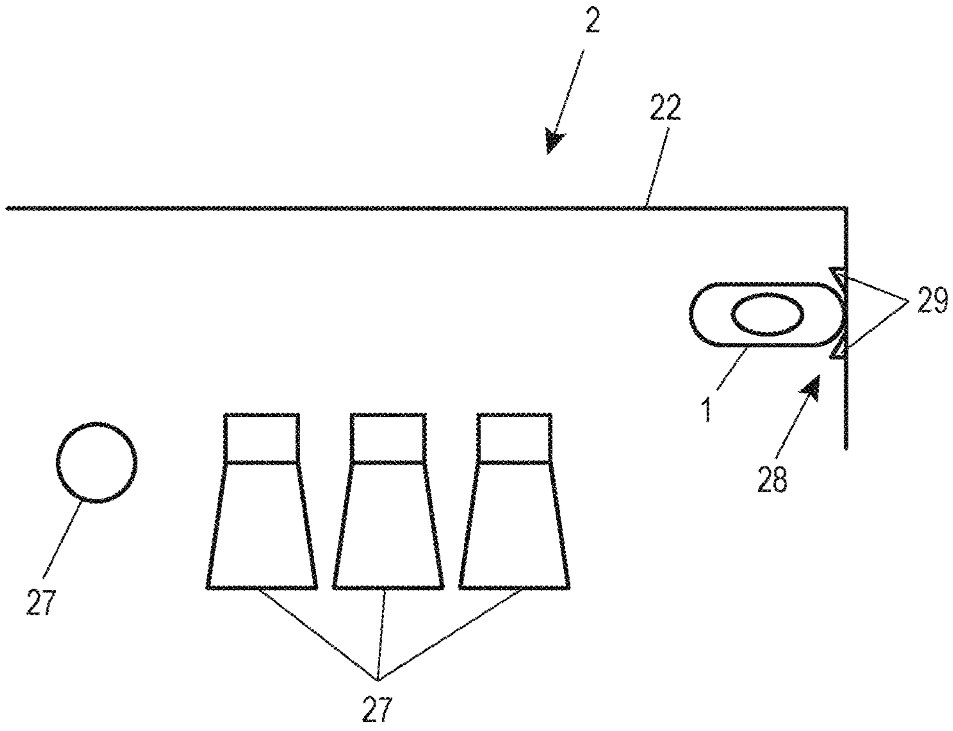
Figure 3C:
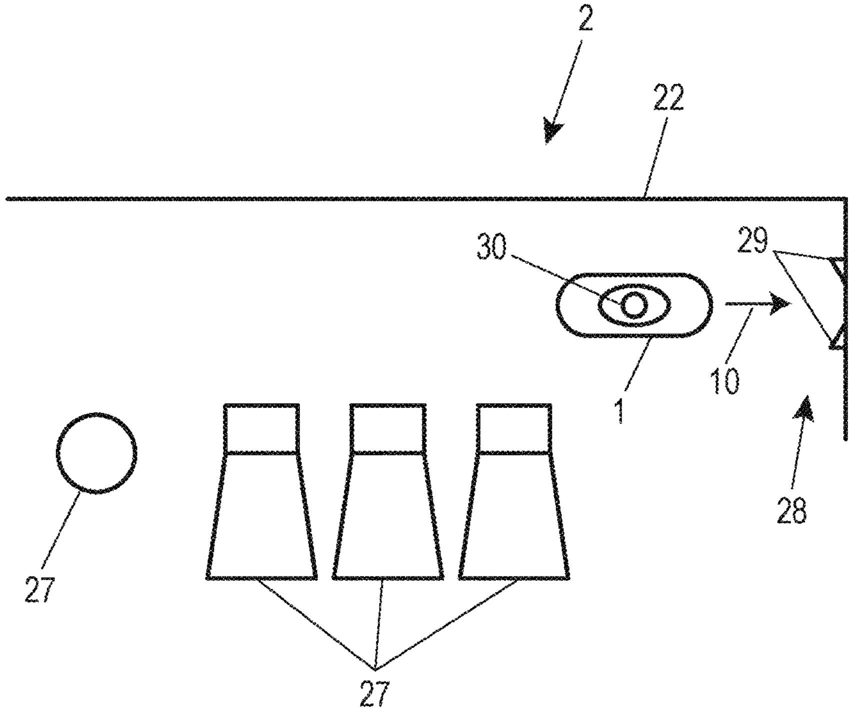

After the driving robot 1 has been brought into the position shown in FIG. 3*a*, a command is triggered by the user which navigates the driving robot 1 into the charging station 28 with the aid of the reflectors 29 until the positioning of the driving robot 1 in the charging station 28 shown in FIG. 3*b* is reached. In response to a further command, the driving robot 1 moves backwards out of the charging station-optionally after a completed charging process—while maintaining its orientation by a defined distance, the length of which can be optionally selected and is shown as a dashed line in the figures, and thus assumes the position shown in FIG. 3*c*. Odometry, orientation with the aid of a gyroscope and/or localization with the aid of the reflectors 29 can be used, for example, to control this position starting from the charging station 28.

In the exemplary embodiment shown, the position taken in this way represents a first marked point, the coordinates of which are stored in the control unit of the driving robot 1. The coordinates refer to the environmental map created by the driving robot 1. This first marked point can be regarded as a kind of fixed point for a route network 3 to be set up, as it is fixed by design due to the positioning of the charging station 28. It is therefore also referred to below as "anchor point 30". In an alternative design of the method, it can also be provided that the first marked point, the anchor point 30, is set to the position of the driving robot 1 in the charging station 28.

At the same time, the anchor point 30 represents a starting point for the first route of the route network 3 to be learned. To define the route, further marked points on the farm 2 are approached manually by the user using the remote control, e.g., a marked point 30*a*, which is located in front of a first of the feed bunkers 27 and represents the position at which the driving robot 1 can pick up feed from this first feed bunker 27.

The position and orientation of the driving robot 1 in front of the first feed bunker 27 is noted in the map guided by the driving robot 1 as a marked point 30*a*, wherein this marked point is assigned information about the function—in this case the picking up of feed from the first feed bunker 27. Marked points, which also include the anchor point 30, are also abbreviated below as POI (Point Of Interest).

The other feed bunkers 27 are then approached in the same way and corresponding POIs 30*b-d* are defined in the map of the driving robot 1 and assigned functions that the driving robot 1 can perform at these points are stored. One possible sequence of functions is, for example

- Stop
- Start mixing device
- Request filling of x kg of feed from the feed bunker with the number y
- Wait until the requested amount of feed has been filled
- Continue driving.

Here, x and y represent parameter values to be used, which are usually specified by the higher-level farm management system. In addition to a list of functions to be executed, it may also be provided to define more complex sequences, e.g., to determine how to deal with errors, e.g., if no or too little feed is dispensed from the feed bunker.

Figure 3D:
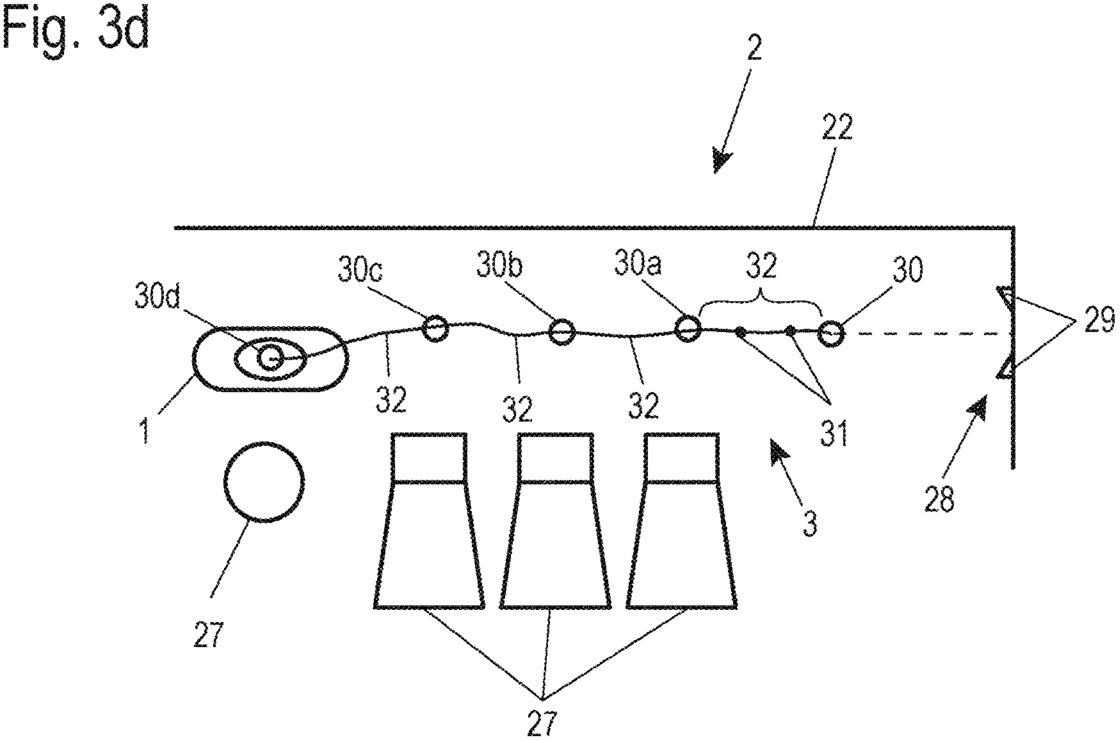

This results in the situation shown in FIG. 3*d*, in which the driving robot 1 is positioned in front of the left feed bunker 27.

While driving along the route from the starting point, the anchor point 30, to an end point, the POI 30*d*, not only the POIs 30*a-d* are recorded on the map, but also a plurality of waypoints 31, of which only two are marked between the POIs 30*a* and 30*b* in FIG. 3*d* as an example. The waypoints 31 are position points along the route traveled, which are recorded and stored at intervals of a few centimeters (cm) up to about 20 cm. The waypoints 31 define the course of a route element 32, which represents the course of the route between two neighboring POIs. Recording the waypoints 31 makes it possible to precisely follow the route elements 32 and thus the trained route. In this sense, the POIs also represent waypoints 31, but they are labeled in that the functions to be carried out as described above can be linked to them and that correction options (see below) can be more limited than with the other, non-labeled waypoints 31.

During manual driving and recording of the route, the remote control is only used to control the driving robot 1 and—when the driving robot 1 is stationary—to mark a marked point and, optionally, to define actions. The latter can also be done retrospectively. The user's concentration can thus be fully focused on the driving robot 1 and distances to obstacles, etc.

Before a recorded route specified by waypoints 31 or POIs 30, 30*a-d* can be traveled autonomously, this route is validated according to the invention by an already autonomously controlled travel of the route, which, however, takes place under the supervision of the user. Only when this validation step has been carried out for a specific route or route section is this route or route section marked as being able to be driven autonomously and can be used as part of an automatic navigation process.

The previously specified route between anchor point 30 and POI 30*d* is intended to be traveled in both directions. In the case of such a route, it may be provided that validation must also take place in both directions of travel. Alternatively, it can also be provided that validation in one direction is sufficient, wherein this direction does not necessarily have to be the direction in which this route was specified.

It may also be provided that the route to be validated or sections of the route to be validated are revised beforehand. Manual control when learning the route can result in unplanned swerves or similar that lead to non-optimal routing. A non-optimal route results in a longer distance being covered and leads to actually avoidable cornering, acceleration and braking actions, which cost energy and put unnecessary strain on the material of the driving robot 1.

To correct the route, in an advantageous design of the method, the recorded route of the previously created route network 3 can be shown on a display, in particular a display of the remote control of the driving robot 1, before validation, wherein the user has the option of correcting route elements 32 or waypoints 31 and sections of route elements 32 between POIs 30, 30*a-d* manually or automatically. Manual correction of coordinates of POIs 30*a-d* can also be provided.

Manual correction can, for example, involve moving a waypoint 31 or a POI 30*a-d*. It may be provided that this shift is only possible by a certain distance in order to prevent the risk of moving waypoints into the area of obstacles. In the case of POIs 30*a-d*, the maximum possible displacement of the coordinates can be more strictly limited so as not to run the risk of the assigned function (e.g., picking up food) being impaired after a displacement. Furthermore, it may be provided that distances between the waypoints 31 and boundaries on the map are determined and that certain safety distances between waypoints 31 and boundary objects, e.g., the walls 22 or the support pillars 23, must be maintained when moving.

In addition to manual correction of route elements 32 or parts of route elements 32, automated correction options may also be available.

One possibility for automated correction is provided by a smoothing function. Here, route elements 32 are smoothed by filter algorithms, e.g., a low-pass filter, in order to reduce possible "snaking" or swerving.

The route elements 32 are thus replaced by smoothed curves, wherein certain boundary conditions, for example a continuous, non-kinking connection to following or preceding route elements 32, e.g., by maintaining tangent gradients in the POIs 30, 30*a-d*, are taken into account. An upper limit for a maximum displacement of waypoints 31 resulting from the automated smoothing can also be defined.

Another option for automated correction, which also results in curve smoothing, is to completely recalculate the position of the waypoints 31 of route elements 32 using suitable parametrically modeled curves. For example, route elements 32 or parts of route elements 32 can be replaced by so-called "splines" or "Bézier curves". Splines and Bézier curves are mathematically determined curve elements that are composed of polynomial functions. As with smoothing using a filter function, certain boundary conditions can also be provided for smoothing using fully calculated waypoints, for example a continuous, non-kinking connection to following or preceding route elements 32. In addition, it may also be provided here that minimum distances to boundary objects, e.g., the walls 22 or the supporting pillars 23, are maintained in order to prevent collisions and to correctly avoid the objects. In addition, it may be provided that certain waypoints 31 are regarded as unchangeable in order to be able to manually influence the route guidance.

Figure 3E:
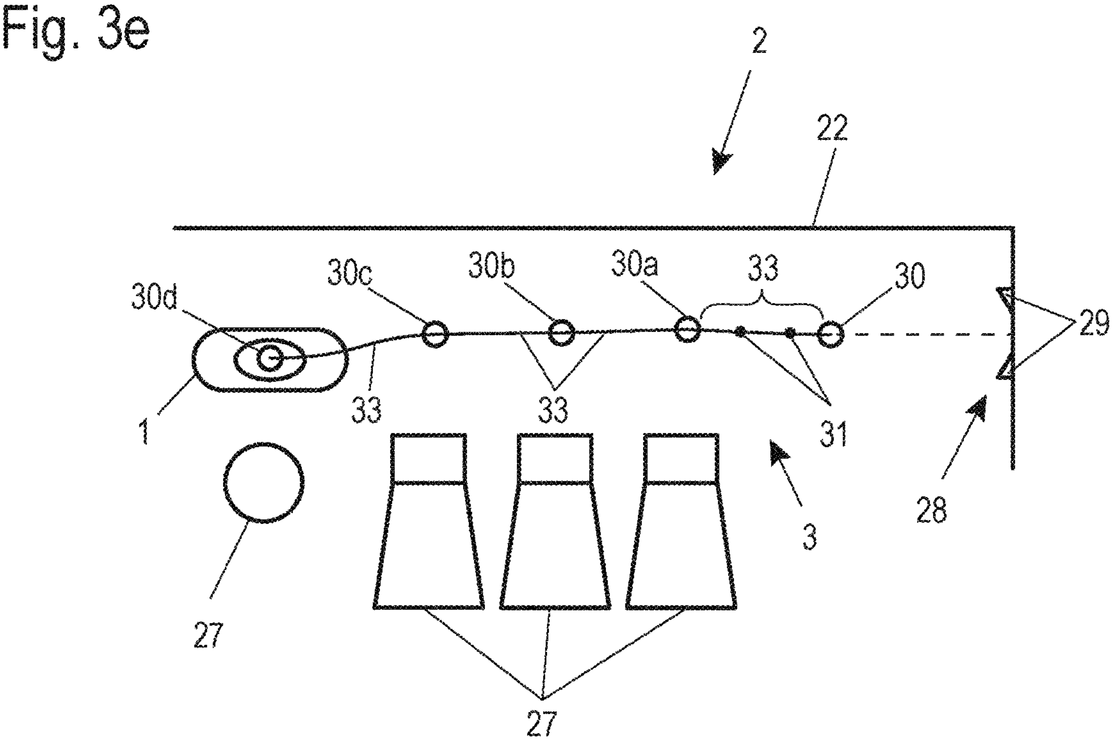

As a result, the route elements 32 are converted into smoothed route elements 33 by the manual or one of the automatic corrections described, as shown in FIG. 3*e*.

In the actual validation step, the driving robot 1 then travels back along the recorded and possibly smoothed route or again in the direction of recording, wherein the user must confirm that route elements 32 have been traveled. For this purpose, it may be provided, for example, that the automatic travel is carried out for as long as a button on the remote control is held down. Each section that is traveled again is marked as "successfully validated". If there is a problem during the run, the user can release the button, whereupon the driving robot 1 stops immediately and switches from the step of validating the route back to the step of recording by manual control. In this way, a route or at least a section of it can then be specified again in corrected form.

Figure 3F:
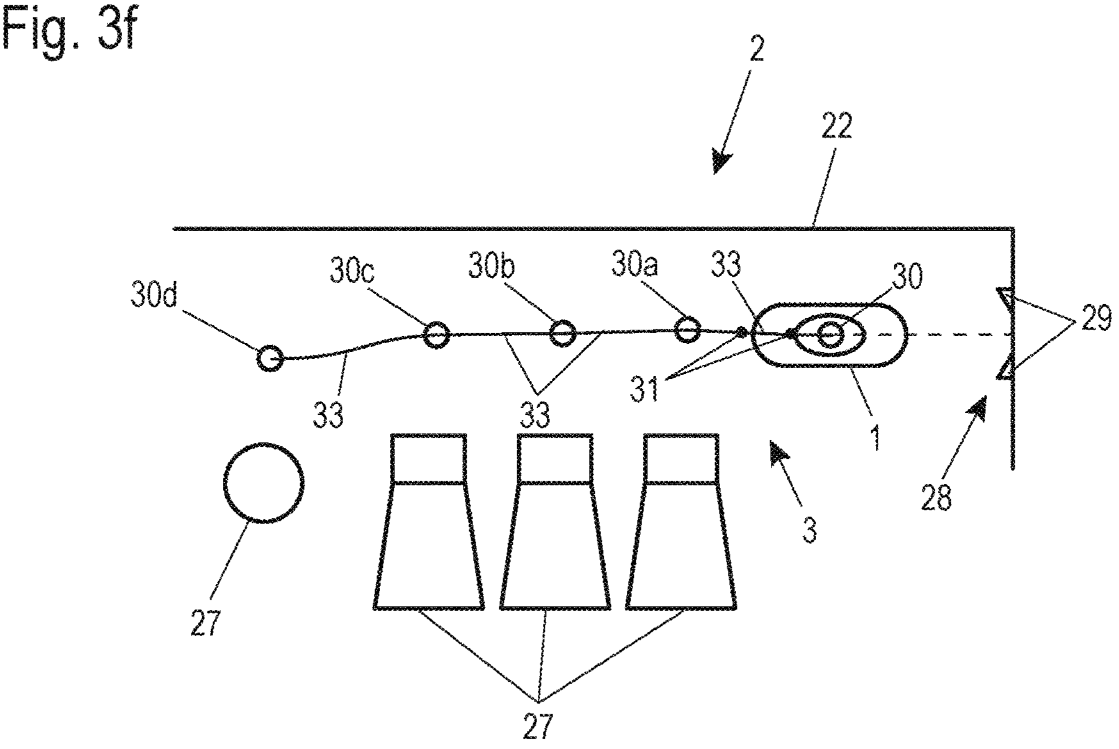

If the route is fully validated by driving over it and confirming, it is then available for autonomous travel. FIG. 3*f* shows the situation after validation of the smoothed route elements 33 after the driving robot 1, starting from its position at POI 30*d*, has automatically traveled the route back to anchor point 30 to validate the route network 3 that has been taught up to that point.

FIG. 4 shows, again for the entire area of the farm 2, how the route network 3 is extended by further routes in subsequent further learning phases. Routes lead both into the first barn 20 and into the second barn 21, defining further points of interest 30*e* to 30*q*, which are associated with various actions. For example, POI 30*e* represents a branching point at which the route starting from anchor point 30 branches either into the first barn 20 or into the second barn 21.

A navigation system can use the route element 32 between the anchor point 30 and the marked point 30*e* for both navigation tasks, i.e., a journey to the first barn 20 or to the second barn 21. A further branching is possible at POI 30*f*, where a total of four route elements 32 converge.

A first possibility starting from the marked point 30*f* runs via the POI 30*g* along the upper animal area 25 of the first barn 20 in FIG. 4. The animals located in the corresponding animal area 25 are fed on the route element 32 running between the marked point 30*g* and a marked point 30*h*. For this purpose, a corresponding command to eject feed along the feed fence 26 is issued at the marked point 30*g*. In addition, the driving robot 1 lowers its driving speed in this area if necessary. The feed ejection ends at POI 30*h*.

From the marked point 30*f*, an alternatively movable route element 32 leads to a marked point 30*j*, at which feeding takes place in the lower animal area 25 in FIG. 4. The path along the corresponding feed fence 26 ends at the marked point 30*k*.

From the end points of the feed ejection, the POIs 30*h* and 30*k* respectively, route elements 32 lead to a marked point 30*i*, at which the return paths join after feeding has been completed. From the marked point 30*i*, a further route element 32 leads back to the marked point 30*f*, wherein the intermediate route element 32 is characterized, for example, by a higher travel speed, which is possible with an emptied feed container 111 of the driving robot 1.

In a similar way to the first barn 20, route elements 32 lead from the marked point 30*e* into the second barn 21. Here, a branching point is defined as the marked point 30*l*, from which route elements 32 lead via the marked points 30*m* and 30*n* along the upper feed fence 26 in FIG. 4 and via marked points 30*p* and 30*q* along the lower feed fence 26 in FIG. 4. Again, a point of union for return journeys is defined by a marked point 300, from which a faster return journey with an emptied feed container 111 of the driving robot 1 is possible.

The recorded route elements 32 shown in FIG. 4 can in turn be smoothed manually and/or automatically in a subsequent step (using filter functions or replaced by mathematically described route elements), resulting, for example, in the route network 3 shown in FIG. 5, in which all or some of the route elements 32 are replaced by smoothed route elements 33.

Subsequently, a validation run is performed for the recorded route elements 32 and, optionally, the smoothed route elements 33, during which the driving robot 1 runs along the route elements 32, 33 and then identifies them as autonomously usable if they are confirmed by the user. Straightening the route elements 32 is particularly useful along the feed fence 26 in order to ensure that food is ejected or pushed at a defined and constant distance from the feed fence 26.

As described above, no additional information, for example measured distances to obstacles, is displayed on the user's remote control during the learning of the routes, i.e., during the specification of the route elements 32 by manual movement. However, both during learning and during validation, it is possible to signal that the safety distances to detected obstacles have not been breached by means of an acoustic and/or visual warning signal on the driving robot 1 itself. This prevents possible collisions without distracting the user's attention from the position and movement of the driving robot 1.

It may be provided that a confirmation of a route element 32 or a route section comprising several route elements 32 or the entire route is actively performed by an action of the user. Alternatively, it may be provided that a confirmation is assumed if the user does not intervene during the validation run by changing the route traveled or stopping the driving robot 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Driving robot
10 Direction of travel
100 Chassis
101 Drive wheel
102 Swivel wheel
103 Apron (feed pusher)
104 Bumper
110 Body
111 Feed container
112 Mixing device
113 Feed conveyor
114 Cladding panels
115 Charging contacts
116 Operating and/or display elements
117 Lidar sensor
118 Ultrasonic sensor
2 Farm
20 First barn
21 Second barn
22 Wall
23 Support pillar
24 Gate
25 Animal area
26 Feed fence
27 Feed bunker
28 Charging station
29 Reflectors
3 Route network
30, 30*a*-*q* Marked point (POI)
31 Waypoint
32 Route element
33 Smoothed route element

The invention claimed is:

1. A method for learning a route of an autonomously driving agricultural robot, the method comprising:
- providing an environmental map;
- driving the autonomously driving agricultural robot along a route lying within a region of the environmental map from a starting point to an end point by manually controlling the autonomously driving agricultural robot;
- localizing the autonomously driving agricultural robot while the autonomously driving agricultural robot travels along the route using at least one sensor arranged on the autonomously driving agricultural robot;
- recording coordinates of waypoints along the route based on the localizing;
- validating the route by autonomously driving the autonomously driving agricultural robot along the route taking into account the recorded coordinates of the waypoints, wherein the route is confirmed manually; and
- marking the manually confirmed route as autonomous.

2. The method of claim 1, wherein, before validating the route, the autonomously driving agricultural robot is manually steered back to the starting point and the validating the route comprises autonomously traveling the route in a same direction specified in the driving the autonomously driving agricultural robot by manually controlling the autonomously driving agricultural.

3. The method of claim 1, wherein the validating the route comprises autonomously traveling the route in a direction opposite to a direction in which the route was specified in the driving the autonomously driving agricultural robot by manually controlling the autonomously driving agricultural.

4. The method of claim 1, wherein the route is confirmed section by section.

5. The method of claim 1, wherein the autonomously driving agricultural robot is controlled manually via a remote control when traveling the route.

6. The method of claim 5, wherein the remote control is coupled wirelessly to a control device of the autonomously driving agricultural robot.

7. The method of claim 5, wherein the route or a route section is considered confirmed when an action is actively performed by a user during the validating the route.

8. The method of claim 7, wherein the action is an operation of a control element on the remote control.

9. The method of claim 1, wherein the route or a route section is considered to be validated if there is no intervention by a user during the validating the route correcting or stopping movement of the autonomously driving agricultural robot.

10. The method of claim 1, wherein a distance to a surrounding object is measured via at least one distance sensor during the manually controlled or automatic travel of the route.

11. The method of claim 10, wherein the distance to the surrounding object is compared with a safety distance and an acoustic or optical warning is emitted when the distance to the surrounding object falls below the safety distance.

12. The method of claim 1, wherein at least one marked point is defined by a user during the driving the autonomously driving agricultural robot by manually controlling the autonomously driving agricultural robot while the autonomously driving agricultural robot is stationary.

13. The method of claim 12, wherein one or more function(s) to be performed are assigned to the autonomously driving agricultural robot at the marked point.

14. The method of claim 12, wherein the at least one marked point includes the starting or end point of at least one route.

15. The method of claim 1, wherein the route is manually modified in whole or in sections by a user before the validating the route by changing the coordinates of the waypoints.

16. The method of claim 1, wherein the route is automatically modified in whole or in sections before the validating the route by changing the coordinates of the waypoints to smooth a course of the route in whole or in sections.

17. The method of claim 16, wherein route elements comprising a plurality of neighboring waypoints are transformed into smoothed route elements by mathematical functions.

18. The method of claim 17, wherein restrictive boundary conditions for modifying the coordinates of the waypoints are predetermined.

19. A system comprising:

an autonomously driving agricultural robot comprising a control device to autonomously drive the autonomously driving agricultural robot; and a remote control coupled to the control device and configured to manually control the autonomously driving agricultural robot, wherein the control device is configured to drive the autonomously driving agricultural robot along a route lying within a region of an environmental map from a starting point to an end point by manually controlling the autonomously driving agricultural robot;

localize the autonomously driving agricultural robot while the autonomously driving agricultural robot travels along the route using at least one sensor arranged on the driving robot;

record coordinates of waypoints along the route based on the localizing;

validate the route by autonomously driving the autonomously driving agricultural robot along the route taking into account the recorded coordinates of the waypoints, wherein the route is confirmed manually; and mark the manually confirmed route as autonomous.

* * * * *